United States Patent [19]

Boaz

[11] Patent Number: 4,596,590
[45] Date of Patent: Jun. 24, 1986

[54] METHOD OF FORMING A GLASS SHEET WITH A CERAMIC PAINT THEREON

[75] Inventor: Premakaran T. Boaz, Livonia, Mich.

[73] Assignee: Ford Motor Company, Dearborn, Mich.

[21] Appl. No.: 728,645

[22] Filed: Apr. 29, 1985

[51] Int. Cl.$^4$ .................... C03B 23/02; C03B 40/00
[52] U.S. Cl. .......................... 65/60.51; 65/24; 65/60.50; 65/60.53
[58] Field of Search ............... 65/60.51, 60.53, 60.50, 65/24

[56] References Cited

U.S. PATENT DOCUMENTS 2,662,035 12/1953 Levi .................... 65/60.51 X
3,468,646 9/1969 Finn et al. ............ 65/60.5 X

FOREIGN PATENT DOCUMENTS 0615421 4/1974 Japan .................. 65/60.51

*Primary Examiner*—Arthur Kellogg
*Attorney, Agent, or Firm*—William E. Johnson; Clifford L. Sadler

[57] ABSTRACT

This specification is directed to a method of forming a glass sheet with a ceramic paint thereon, the method having the following steps. A ceramic paint is applied to the glass sheet. The ceramic paint includes normal ceramic paint components along with, as a new component thereof, a metal oxide having at least a low valence oxidation state and a high valence oxidation state. The metal oxide is in its low valence state when applied in the ceramic paint to the glass sheet. The glass sheet is heated to a temperature which softens the glass sheet sufficiently so that the glass sheet can be formed. The glass sheet and the ceramic paint thereon are engaged with a fiberglass covered forming die to form the heated glass sheet to a desired shape. The forming die is removed from engagement with the glass sheet. The metal oxide addition to the ceramic paint in its low valence state is credited with being effective to prevent sticking of any of the ceramic paint to the forming die. The glass sheet is cooled to obtain a formed glass sheet with a ceramic paint thereon.

8 Claims, No Drawings

METHOD OF FORMING A GLASS SHEET WITH A CERAMIC PAINT THEREON

TECHNICAL FIELD

This application is directed to a method of forming a glass sheet with a ceramic paint thereon. The ceramic paint composition is one which does not stick to fiberglass materials at elevated temperatures when the fiberglass is brought into contact therewith. The method of forming the glass sheet is one which allows a ceramic painted glass sheet to be contacted by a fiberglass covered forming die which forms the glass in a heated condition into a desired shape. The forming operation may be carried out without any sticking of the ceramic paint to the fiberglass forming die.

BACKGROUND AND PRIOR ART STATEMENT

Ceramic paint compositions are generally well known to the skilled artisan. These ceramic paint compositions can be used, for example, to form borders around the edge of glass sheets which are used as windshields, sidelites or backlites in motor vehicles.

Such ceramic paints usually include a mixture of metal oxides which together act as a coloring agent for the ceramic paint. The metal oxides are nonreactive with one another and nonreactive with any elements or compounds they come in contact with while being heated to temperatures up to about 1300° F. The mixture of meal oxides can be controlled so as to get a selected color from the ceramic paint composition. Normally, in automotive applications, the selected color is black.

Such ceramic paint compositions also include a low melting point glass frit which generally melts at a temperature below 1300° F. The low melting point glass frit is the material which bonds the mixture of metal oxides to a glass sheet and ensures that it remains after the glass sheet has been cooled back to room temperature. A vehicle is normally mixed with the metal oxides and low melting point glass to allow the ceramic paint composition to be applied in a paint application process. For example, if the paint application process is a silk screen printing operation, the vehicle may be an organic medium which forms the vehicle for carrying the other materials during the silk screen printing operation.

Many different types of ceramic paint compositions of the above general type are well known to skilled artisans. The exact metal oxides and low melting point glass frit and vehicle selected for such paints is well within the skill of artisans in this area. The manner in which the different materials may be varied in order to achieve the results desired in a particular application is again well within the skill of an artisan.

However, I found that in the situation where a sheet having a ceramic paint thereon was contacted by a fiberglass forming die that ceramic paints of the above described general composition had a great tendency to stick on the fiberglass covered die. It is, of course, obvious that the sheet of glass has to be heated to an elevated temperature, generally less than 1300° F., so that it may be engaged by a forming die and formed into a configuration other than flat.

Thus, the difficulty arose that the ceramic paint compositions generally known to skilled artisans would not operate in a glass forming process in which a heated glass sheet containing the ceramic paint composition was engaged by a fiberglass covered forming die. No other materials are known for covering the forming die because the fiberglass is the only material which will withstand the heat and rigorous requirements of the environment to which it is subjected. Other materials that have been used to cover forming dies quickly break down and wear out when repeatedly brought into engagement with the surface of a healed glass sheet. Thus, fiberglass is the material which is used to cover forming dies and this material unfortunately sticks to the ceramic paint compositions known to skilled artisans when those compositions are heated to an elevated temperature necessary in order to form glass by a forming die.

Thus, the problem presented to me was one of developing a method of forming glass sheets with a ceramic paint thereon which could withstand high temperatures and repeated engagements of painted glass sheets by the same forming die without paint sticking to the forming die. I have solved this problem by the addition of a material to the ceramic paint composition which provides for a nonstick barrier between the heated ceramic paint composition on a heated glass sheet and a fiberglass forming die coming into contact therewith.

No search was conducted on the subject matter of this specification in the U.S. Patent and Trademark Office or in any other search facility. However, I am aware of most prior art in this area because of my extensive work in this area, and I know of no prior art more relevant to this subject matter than that which was set forth above, namely, the general discussion of previously known ceramic paint compositions which could not withstand being engaged by fiberglass forming dies.

DISCLOSURE OF INVENTION

This invention is directed to a method of forming a glass sheet with a ceramic paint thereon.

The ceramic paint composition used with the method of my invention comprises the following materials. A mixture of metal oxides is provided, which together act as a coloring agent for the ceramic paint. The mixture of metal oxides are nonreactive with one another and nonreactive with any elements or compounds they come in contact with while being heated to a temperature in a range up to 1300° F. A low melting point glass frit is also part of the ceramic paint composition. This low melting point glass frit is a glass material which melts below 1300° F. to act as a binding material to bind the metal oxides to a glass surface.

My ceramic paint composition also includes, as an element thereof, a metal oxide powder. The metal oxide powder included is one in which the metal oxide has at least a low valence oxidation state and a high valence oxidation state. The metal oxide included in the ceramic paint at its inception is metal oxide in its low valence state. A vehicle is also mixed with the metal oxides, the low melting point glass frit, and the metal oxide powder having at least two valence states to form all of the mentioned materials into a ceramic paint which can be applied to the glass surface.

There may be some metal oxides in the mixture of metal oxides which also have two or more valence oxidation states. However, because of the way the mixture of metal oxides is made, such metal oxides are oxidized to their highest valence states prior to being formed into the mixture and thus they are nonreactive with one another and nonreactive with any elements or compounds they come in contact with while being heated to temperatures in a range up to 1300° F. It is, of course, readily apparent that if the mixture of metal oxides had the same characteristics as the metal oxide powder I now add, the ceramic paint compositions known in the prior art would have nonstick characteristics but, in fact, they do not. Thus, the mixture of metal oxides is not of the type defined by me herein as the metal oxide powder I desire added to the ceramic paint composition.

Further details of the ceramic paint composition will be set out in a later portion of this specification dealing with the Best Mode and Industrial Applicability of my invention. The paint composition is claimed in my copending U.S. patent application Ser. No. 728,646, filed on the same date as this application.

My invention is directed to a method of forming a glass sheet with a ceramic paint thereon.

In accordance with the teachings of the method of my invention, the following steps are carried out. A ceramic paint is applied to a glass sheet. The ceramic paint includes metal oxide powder having at least a low valence oxidation state and a high valence oxidation state, the metal oxide included in the ceramic paint being in its low valence state when applied. The remainder of the ceramic paint may be made up as known by skilled artisans from metal oxides which together act as coloring agents for the ceramic paint, those metal oxides being nonreactive with one another and nonreactive with any elements or compounds they come in contact with while being heated to temperatures up to 1300° F. The ceramic paint, in addition, includes a low melting point glass frit and a vehicle needed to transport the other remaining materials so that they may be applied to the glass sheet.

After the application of the ceramic paint, the glass sheet is heated to a temperature which softens the glass sheet sufficiently so that the glass can be formed. The glass sheet and the ceramic paint thereon are then engaged with a fiberglass covered forming die to form the heated glass sheet to a desired shape.

After shaping, the forming die is removed from engagement with the glass sheet, the metal oxide addition to the ceramic paint being effective to prevent sticking of any of the ceramic paint to the forming die. The glass sheet is cooled to obtain a formed glass sheet with a ceramic paint thereon.

Once again, further details of the method of my invention will be set forth in the Best Mode and Industrial Applicability portion of this specification.

BEST MODE AND INDUSTRIAL APPLICABILITY

The novel features that are considered characteristic of my method of forming a glass sheet with ceramic paint thereon are set forth with particularity in the appended claims. The invention itself, however, both as to its organization and its method of operation, together with additional objects and advantages thereof, will best be understood from the following description of specific embodiments.

The following description is what I now consider to be a preferred embodiment of the method of forming a glass sheet with a ceramic paint thereon as per my invention. The following description also sets forth what I now contemplate to be the best mode of making the ceramic paint composition and of forming a glass sheet with a ceramic paint thereon. The description is not intended to be a limitation upon the broader principles of this invention, and while preferred materials are used to form the ceramic paint composition in accordance with the requirements of the laws, the specification also sets forth the critical limits with respect to the general description of these materials.

A ceramic paint composition useful with the method of my invention comprises the following materials. The first material is a mixture of metal oxides which together act as a coloring agent for the ceramic paint. These metal oxides, because of their manufacturing process, are normally all in their highest oxidation state. A small proportion of the metal oxides may have a lower valence state simply because of manufacturing variability. However, normally the mixture of metal oxides used as a coloring agent is in its highest oxidation state because of the manufacturing process, and thus the mixture of metal oxides is nonreactive with one another and nonreactive with any elements or compounds they come in contact with while being heated to temperatures in a range up to 1300° F.

The nonreactive oxides generally include oxides of material such as chrome, cobalt, nickel, manganese, iron and copper. Such a mixture is commonly known as black oxide powder and is well known in the industry. Any oxide included in this material is normally in its highest valence oxidation state because of the process of manufacture and because those who are purchasing the black oxide powder mixture desire a material which does not react when heated to moderate temperatures. Other mixtures of oxides may be put together in order to get different colors, as is well known in the industry. In normal practice, the mixture of nonreactive metal oxides makes up about 8–25% by weight of the ceramic paint composition, preferably 10–20% by weight, and most preferably 16% by weight.

A second material forming the ceramic paint composition is a low melting point glass frit. Normally, the low melting point glass frit is a lead borosilicate glass frit high in lead content. Any other low melting point glass frit is also suitable, but the lead borosilicate glass is preferred because it is readily available and relatively cheap. This material is included in a range of 30–50% by weight.

In accordance with the teachings of the method of my invention, a metal oxide powder having at least a low valence oxidation state and a high valence oxidation state is also included. In accordance with the teachings of the preferred embodiment, the material used is stannous oxide and it is used in a 5–25% by weight amount in the composition, preferably 10–20% by weight, and most preferably 17% by weight. However, other metal oxides, or mixtures thereof, having at least two valence states may be used. However, when the metal oxide is used, it is incorporated into the ceramic paint in its low valence oxidation state. For example, if iron oxide is used, it would be included as ferrous oxide. Similarly, if copper powder was used, it would be included as cupprous oxide. Similarly, with other metals having more than two valance states, they would be included in their lower metal oxidation state.

A vehicle may be mixed with the metal oxides, the low melting point glass frit, and the metal oxide powder having at least two valence states to form all of the mentioned materials into a ceramic paint which can be applied to a glass surface. For example, if the ceramic paint is to be applied in a silk screen printing operation, a UV curable organic medium may be used. This organic medium would make up 20-35% by weight of a paint composition.

However, if electrostatic means were being used to apply the ceramic paint composition, no vehicle would be necessary as the electrostatic application would not require the same. In other operations, for example, water might be the vehicle in order to make a ceramic paint in a water slurry. Such a paint may be applied by a process of air spray or airless spray system. Other materials which may be used are known to the artisans, for example, pine oil and other organic vehicles.

The whole thing that makes the ceramic paint composition nonstickable is the metal oxide powder having at least a low valence oxidation state and a high valence oxidation state being present in the composition in its low valence oxidation state. I believe that when this metal oxide powder is subjected to a heating operation, that portion of the powder on the upper surface of the ceramic paint composition readily oxidizes to form an excellent, fully oxidized metal oxide barrier across the top surface of the paint which insulates the low melting point glass frit and isolates the same from the fiberglass cloth. Thus, the fiberglass cloth, while contacting the surface, does not adhere to the ceramic paint and the paint does not stick to the cloth. I believe this is the mechanism by which the nonstick characteristics of my paint composition are achieved, but I do not wish to be bound by this theory. I know, in fact, that if you follow what I have said, the paint will not stick.

As previously stated, ceramic paint compositions are well known in the art and general details thereof have been set forth above. Commercial compositions are available through Drakenfeld as 24-2247 and 24-2279. Also, Ferro Company makes a ceramic paint composition which is marketed under their number 3501. These paint compositions are made generally as described above, but these are materials which are available. If one adds to these compositions a metallic oxide powder having at least a low valence oxidation state and a high valence oxidation state in its low valence oxidation state at the levels I indicated above, namely, 5-25% of the total weight thereof, these standardly available ceramic paint compositions will also be nonstickable to fiberglass covered surfaces in glass forming operations.

In accordance with the teaching of my invention, a method of forming a glass sheet with a ceramic paint thereon is set forth. The method has the following steps. A ceramic paint is applied to the glass sheet. The ceramic paint includes a mixture of metal oxides which together act as a coloring agent for the ceramic paint. The metal oxides are oxides which are nonreactive with one another and nonreactive with any elements or compounds they come in contact with while being heated to temperatures up to 1300° F. A low melting point glass frit is also included in the ceramic paint composition.

A principal ingredient from a functional standpoint in achieving nonstick capabilities for the ceramic paint is a metal oxide powder having at least a low valence oxidation state and a high valence oxidation state. As fully discussed above, the metal oxide is included in its low valence state in the ceramic paint composition. A vehicle generally is also mixed with the metal oxides, the low melting point glass frit and the metal oxide powder having at least two valence states to form all of the mentioned materials into a ceramic paint which can be applied to a glass surface. As discussed above, the vehicle selected depends on the mode in which the ceramic paint is to be applied. In fact, as discussed above, if the ceramic paint is to be applied in an electirostatic operation, no vehicle may be required at all.

After the ceramic paint has been applied to the glass sheet, the glass sheet is heated to a temperature which softens the glass sheet sufficiently so that the glass sheet can be formed. Generally, this temperature is in a range of about 1175-1250, which is below 1300° F. After heating, the glass sheet and the ceramic paint thereon are engaged with a fiberglass covered forming die to form the heated glass sheet into a desired shape. The forming die is removed from engagement with the glass sheet and the ceramic paint thereon. The metal oxide addition to the ceramic paint is effective to prevent sticking of any of the ceramic paint to the forming die.

As stated above, I believe the mechanism involved is one in which the metal oxide powder along the top surface of the paint is oxidized to its higher metal oxidation state and thus forms a barrier between the paint and the fiberglass of the forming die which prevents sticking of the paint to the fiberglass covered forming die. However, I do not wish to be bound by that theory as it is in fact a theory I have not yet proven. I do, however, know that when one follows the method taught herein using the ceramic paint taught herein, there is no sticking of the ceramic paint during the forming step to the fiberglass of the forming die. This is the beneficial result which I sought and which I have achieved.

After the forming die has been removed from engagement with the glass sheet and the ceramic paint without any sticking of the ceramic paint thereto, the glass sheet may be cooled to obtain a formed glass sheet with ceramic paint thereon. Normally, the glass sheet is rapidly cooled in a glass tempering operation in order to achieve a tempered glass product having the ceramic paint thereon.

The method disclosed above is one which uses the ceramic paint composition disclosed above. All of the discussion about the ceramic paint may be carried over to this method, including the general limitations on quantities of material and types of material.

While particular embodiments of the invention have been illustrated and described, it will be obvious to those skilled in the art that various changes and modifications may be made to my invention without departing from the invention, and it is intended to cover in the appended claims all such modifications and equivalents as fall within the true spirit and scope of this invention.

I claim:

1. A method of forming a glass sheet with a ceramic paint thereon, which method comprises the steps of:
applying a ceramic paint to said glass sheet, said ceramic paint including a metal oxide powder having at least a low valence oxidation state and a high valence oxidation state, said metal oxide powder being in its low valence state when applied;
heating said glass sheet to a temperature which softens said glass sheet sufficiently so that said glass can be formed;
engaging said glass sheet and said ceramic paint thereon with a fiberglass covered forming die to form said heated glass sheet to a desired shape;
removing said forming die from engagement with said glass sheet, said metal oxide addition to said ceramic paint being effective to prevent sticking of any of said ceramic paint to said forming die; and
cooling said glass sheet to obtain a formed glass sheet with a ceramic paint thereon.

2. The method of claim 1, wherein said ceramic paint comprises:

a mixture of metal oxides which together act as a coloring agent for the ceramic paint, said metal oxides being nonreactive with one another and nonreactive with any elements or compounds they come in contact with while being heated to temperatures in a range up to 1300° F.;

a low melting point glass frit;

a metal oxide powder having at least a low valence oxidation state and a high valence oxidation state, said metal oxide being in its low valence oxidation state when formed into the ceramic paint; and a vehicle mixed with said metal oxides, low melting point glass frit, and metal oxide powder having at least two valence states to form all of said mentioned materials into a ceramic paint which can be applied to a glass surface.

3. The method of claim 2, wherein no vehicle is used in said ceramic paint composition and wherein an electrostatic deposition operaion is used to apply said ceramic paint.

4. The method of claim 1, wherein said ceramic paint composition, comprises:

8-25% by weight of a mixture of metal oxides which together act as a coloring agent for the ceramic paint, said metal oxides being nonreactive with one another and nonreactive with any elements or compounds they come in contact with while being heated to temperatures in a range up to 1300° F.;

30-50% by weight of a low melting point glass frit;

5-25% of a metal oxide powder having at least a low valence oxidation state and a high valence oxidation state, said metal oxide being in its low valence oxidation state when formed into the ceramic paint; and 0-35% by weight of a vehicle mixed with said metal oxides, low melting point glass frit, and metal oxide powder having at least two valence stales to form all of said mentioned materials into a ceramic paint which can be applied to a glass surface.

5. The method of claim 4, wherein in said ceramic paint composition said mixtre of metal oxides is present in an amount of 10-20% by weight, said low melting point glass frit is present in a range of 35-45% by weight, and said metal oxide powder is present in a range of 10-20% by weight.

6. The method of claim 5, wherein said metal oxide powder is stannous oxide.

7. The method of claim 4, wherein in said composition said mixture of metal oxides is present in an amount of 16% by weight, said low melting point glass frit is present in a range of 42% by weight, and said metal oxide powder is present in a range of 17% by weight.

8. The method of claim 7, wherein said metal oxide powder is stannous oxide.

* * * * *